Feb. 26, 1963 B. J. YOKELSON 3,079,513
RING COUNTER EMPLOYING NOR STAGES WITH PARALLEL INPUTS AND CAPACITIVE INTERSTAGE TRIGGERING
Filed Sept. 25, 1959
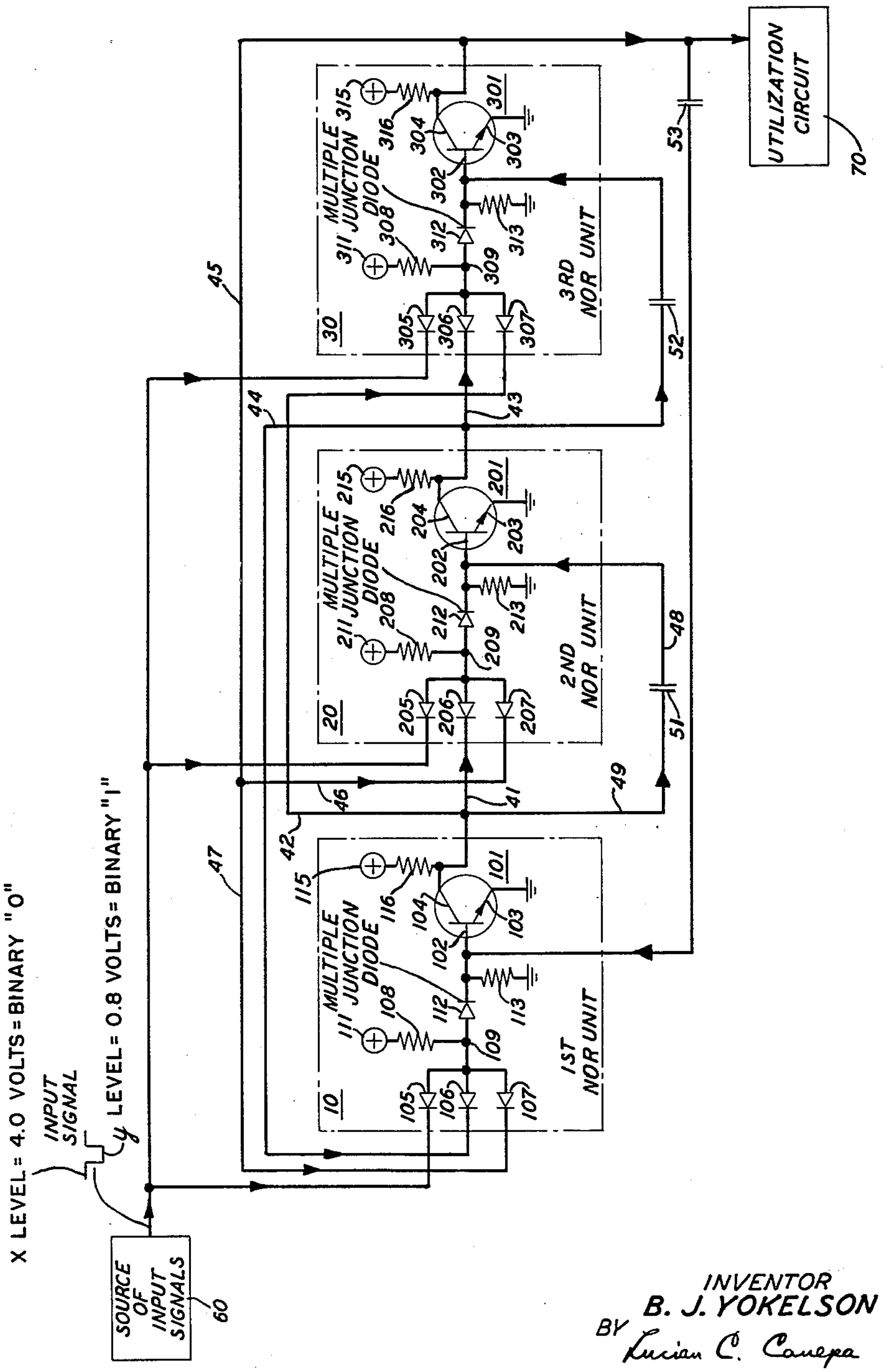
INVENTOR
B. J. YOKELSON
BY Lucian C. Canepa
ATTORNEY United States Patent Office 3,079,513
Patented Feb. 26, 1963

3,079,513

RING COUNTER EMPLOYING NOR STAGES WITH PARALLEL INPUTS AND CAPACITIVE INTER-STAGE TRIGGERING

Bernard J. Yokelson, North Caldwell, N.J., assignor to Bell Telephone Laboratories, Incorporated, New York, N.Y., a corporation of New York Filed Sept. 25, 1959, Ser. No. 842,312
1 Claim. (Cl. 307—88.5)

This invention relates to the processing of electrical signals and more particularly to the counting of such signals.

One type of counting circuit arrangement commonly included in information processing systems comprises an array of bistable elements wherein the condition or state of one element is different from that of the others (for example, one element ON and the others OFF), the array being interconnected with a source of input signals in a manner such that the application successive signals to the elements causes the unique state of the array to be sequentially transferred from element to element. Typically, the output of the last bistable element of such a counting circuit is connected back to an input of the first bistable element thereof, thereby forming a closed loop or ring configuration which is known as a ring counter.

The logical operation of the above-described type of ring counter is commonly subject to the difficulty that noise pulses or other undesirable circuit influences produce a stable condition of the counter in which two of the bistable elements thereof are in their ON states at a given time. Then, input signal pulses to be counted cause both ON states to be sequentially transferred around the ring configuration, which method of operation is, of course, not the intended one.

An object of the present invention is an improved counter.

More specifically, an object of this invention is a simple and reliable counter in which only one of the elements may be in a condition different from the others at any time.

Another object of this invention is a ring counter in which the advancement of the unique state of the counter from element to element is simple and foolproof.

These and other objects of the present invention are realized in an illustrative embodiment thereof which is a ring counter that may be regarded from an overall standpoint as an $n$-stable arrangement having $n$, and only $n$, stable states. This is in contrast to the more typical ring counter arrangement, which includes, as noted above, a plurality of intercoupled bistable elements and wherein there exists the possibility of the occurrence of a stable condition in which two of the elements are in a state different from that of the others. The illustrative embodiment comprises $n$ NOR units, the output of each unit being connected to an input of each of the other units, whereby an ON unit of the counter positively locks all other units thereof in their OFF states. The input signal pulses to be counted are applied to an input circuit of each of the units, thereby tending to turn off or maintain turned off all the units. However, the embodiment also includes a plurality of interunit capacitive memory elements which serve to couple an energizing signal from the unit that had been ON to a next unit in the ring, thereby turning and maintaining the next unit ON during the duration of an input signal.

A feature of the preset invention is an $n$-stable ring counter comprising $n$ NOR units each including a transistor having base and emitter input electrodes, a collector output electrode, and an input circuit connected to the base electrode, circuitry connecting the collector electrode of each unit to the input circuit of each other unit, a capacitive memory element intercoupling the output electrode of each unit and the base electrode of the next unit, and circuitry for applying input signal pulses to be counted to the input circuit of each unit.

Another feature of this invention is an arrangement including a plurality of NOR units, the output electrode of each of which is connected to the input circuit of each of the other NOR units, whereby an ON unit positively locks all other units of the arrangement in their OFF states.

Still another feature of the present invention is a ring of NOR units between adjacent ones of which are respectively connected capacitive memory elements, whereby the application of an input signal pulse to each of the units turns off or maintains turned off all the units but the one which is capacitively coupled to the unit that had been ON.

A further feature of this invention is a ring counter consisting of NOR units and capacitors.

A complete understanding of the present invention and of the above and other features thereof may be gained from a consideration of the following detailed description of an illustrative embodiment thereof taken in conjunction with the accompanying drawing, the single FIGURE of which depicts a specific ring counter made in accordance with the principles of this invention.

It will be helpful, before proceeding to the detailed description of an illustrative embodiment of this invention, to describe the nature of a NOR unit and to specify several logic technologies from which NOR units of ring counters illustratively embodying the principles of the present invention may be formed. A NOR unit is a circuit having an output path and a plurality of input paths and performs the logical function of providing a "1" signal on its output path only if a "0" signal is coupled to every one of its input paths. A "0" signal appears on the output path of the unit if a "1" signal is coupled to at least one of its input paths.

The NOR units of ring counters illustratively embodying the principles of the present invention may be formed from the basic building blocks of any one of a number of logic technologies. Typical of these technologies are: transistor registor logic or T.R.L., which includes a basic logic circuit or building block comprising a transistor and a plurality of resistors; transistor diode logic or T.D.L., which includes a basic logic circuit or building block comprising a transistor and a plurality of diodes; and low level logic or L.L.L., which includes a basic logic circuit also comprising a transistor and a plurality of diodes. Each of these transistor technologies, as well as other known technologies not specifically enumerated, is characterized by a unique set of properties which are determinative of the suitability of the technology for a given application. These properties include speed of operation, power supply requirements, size, reliability and economy of design.

The basic building block of the technology known as low level logic has proven to be advantageous in a wide variety of circuit applications. Therefore, the illustrative presentation herein of specific embodiments of the principles of this invention will be directed to NOR units formed from the basic building block of low level logic. In such NOR units a relatively low voltage level represents a "1" signal and a relatively high voltage level represents a "0" signal. Reference may be made to the copending application of W. B. Cagle-W. H. Chen, Serial No. 642,818, filed February 27, 1957, now Patent 2,964,653, issued December 13, 1960, for a more complete disclosure of the fundamental principles of L.L.L.

The illustrative ring counter shown in the drawing includes identical first, second and third NOR units 10, 20 and 30, respectively. The first NOR unit 10 comprises an n-p-n transistor 101 having an input or base electrode 102, a grounded emitter electrode 103, and an output or collector electrode 104 to which are connected a positive source 115 of direct-current potential and a resistor 116. Connected to the base electrode 102 is an input circuit which includes single junction diodes 105, 106 and 107, a resistor 108, a positive source 111 of direct-current potential, a multiple junction diode 112, and a resistor 113. Alternatively, the transistor of the unit 10 may be a p-n-p device, in which case only the polarity of the sources 111 and 115 shown in the drawing need be changed.

Note that the elements of the units 20 and 30 have been assigned reference numerals whose last two digits are the same as the corresponding elements of the unit 10.

Advantageously, the current-voltage characteristic of each of the mutliple junction diodes 112, 212 and 312 of the ring counter shown in the drawing is such that negligible current flows through the diode until the voltage thereacross reaches some appreciable value of forward-bias such as, for example approximately 1.5 volts. Hence as described in detail hereinbelow these diodes are well suited for controlling the direct-current voltage level appearing at the base electrodes of the transistors 101, 201 and 301, and, therefore, for switching these transistors in a positive manner between their ON and OFF states. As disclosed in the aforementioned Cagle-Chen patent either Zener diodes, poled in opposition to the diodes 112, 212 and 312, or voltage dividing networks may also be utilized to perform this positive switching action.

The collector electrode of each NOR unit of the ring counter described herein is directly connected to the input circuit of each of the other NOR units thereof. Thus, the collector electrode 104 of the NOR unit 10 is connected by means of a lead 41 to the input circuit of the NOR unit 20 and by means of a lead 42 to the input circuit of the NOR unit 30. Similarly, the colletcor electrode 204 of the NOR unit 20 is connected by means of a lead 43 to the input circuit of the NOR unit 30 and by means of a lead 44 to the input circuit of the NOR unit 10. Further, the collector electrode 304 of the NOR unit 30 is connected by means of leads 45 and 46 to the input circuit of the NOR unit 20 and by means of leads 45 and 47 to the input circuit of the NOR unit 10.

Also, the collector electrode of each NOR unit is connected through a capacitor to the base eletcrode of the next following unit in the ring configuration. Specifically, the collector electrode 104 of the NOR unit 10 is connected through a capacitor 51 to the base electrode 202 of the transistor 201 of the unit 20; the collector electrode 204 of the NOR unit 20 is connected through a capacitor 52 to the base electrode 302 of the transistor 301 of the unit 30; and the collector electrode 304 of the NOR unit 30 is connected through a capacitor 53 to the base electrode 102 of the transistor 101 of the NOR unit 10.

The drawing also depicts a utilization circuit 70 and a source 60 of input signals, which source is coupled to the input circuits of the NOR units 10, 20 and 30. Utilization circuits may be connected so as to be responsive to the voltage levels appearing at one or more of the collector or output electrodes of the herein-described ring counter. Illustratively, however, as shown in the drawing, a single utilization circuit 70 may be connected only to the output electrode 304 of the third NOR unit 30.

The operation of the depicted ring counter is as follows: First, assume that of the two possible voltage levels realizable at any collector electrode the lower level represents a "1" signal and the higher level represents a "0" signal. Then assume further that because of a previous operation of the counter the transistor 101 of the first NOR unit 10 is conducting. As a result thereof, the colletcor-to-emitter impedance of the transistor 101 is very low and the collector electrode 104 is, therefore, almost at ground potential, which relatively low potential is, as indicated above, representative of a "1" signal.

The "1" signal or low voltage output of the collector electrode 104 is coupled to the diode 206 of the second NOR unit 20 and to the diode 307 of the third NOR unit 30. This causes circuit points 209 and 309 to be at potentials near ground and the currents through the multiple junction diodes 212 and 312 to be negligible since the voltages across them are then too low to cause appreciable current conduction therethrough. Thus, the voltage drop across resistor 213 is very small, thereby causing the base-to-emitter voltage of the transistor 201 to be near zero and the transistor 201 to be nonconducting, whereby the collector electrode 204 thereof assumes a relatively high positive potential which is representative of a "0" signal.

Similarly, the establishment near ground of the potential of the point 309 causes the diode 312 to conduct negligible current, thereby causing the base-to-emitter voltage of the transistor 301 to be near zero and the transistor 301 to be nonconducting, whereby the collector electrode 304 thereof assumes a relatively high positive potential which is representative of a "0" signal.

Looking at the input circuit of the first NOR unit 10 and assuming that the source 60 normally couples a relatively high positive potential $x$, that is, a "0" signal, to the input circuits of the units 20, 20 and 30, it is seen that each of the cathodes of the diodes 105, 106 and 107 of the unit 10 is connected to a relatively high positive potential, whereas the anodes thereof are connected together and to the circuit point 109, which point, by proper selection of the values of the source 111, the resistor 108, the diode 112 and the resistor 113, may be easily arranged to be of a value sufficient to cause the diode 112 to conduct heavily. In other words, the point 109 is arranged to be more negative than every one of the potentials appearing on the cathodes of the diodes 105, 106 and 107. Accordingly, none of the diodes 105, 106 and 107 conducts and there is established across the resistor 113 a potential drop of a polarity which forward-biases the base-to-emitter junction of the transistor 101 to maintain the transistor in a conducting state.

Thus, based on the assumption that the NOR unit 10 was initially conducting, it has been demonstrated that that condition positively locks the other NOR units of the depicted ring counter in their OFF states and, further, that the circuit configuration is so arranged as to maintain the unit 10 in its ON state. Hence, the assumed circuit condition is seen to be one of stable equilibrium.

During the time that the input source 60 is coupling a voltage of level $x$ to the input circuits of the units 10, 20 and 30 (in other words, in the absence of an input signal), and while the transistor 101 of the unit 10 is conducting, the charge on the capacitor 51 is approximately zero, for the left-hand plate thereof is connected to the collector of the conducting transistor 101, which collector, as indicated above, is almost at ground potential, and the right-hand plate thereof is connected to ground through the resistor 213.

Assume now that the input source 60 couples a voltage of level $y$, which level is less positive than that of the level $x$, to the input circuits of the NOR units 10, 20 and 30. This relatively less positive or "1" signal voltage causes the circuit points 109, 209 and 309 to fall to or to remain at potential levels which are insufficient to cause conduction in the diodes 112, 212 and 312, thereby tending to establish zero potentials across the base-to-emitter junctions of the transistors 101, 201 and 301 and, thus, to turn off or maintain turned off all the transistors of the counter.

However, during the time that an input signal is coupled to the NOR units 10, 20 and 30, the capacitor connected to the collector electrode of the unit whose transistor had been conducting begins to charge, thereby causing the turnon of the next unit of the ring despite the coupling of an inhibiting input signal thereto. Specifically, for the case where the first NOR unit 10 had been conducting, the application of an input signal from the source 60 causes the right-hand plate of the capacitor 51 to charge to a potential which is negative with respect to the left-hand plate thereof. The charging current, which flows along a path comprising the lead 48, the resistor 213, the source 115, the resistor 116 and lead 49, establishes a potential drop across the resistor 213 of a polarity which forward-biases the base-to-emitter junction of the transistor 201, thereby to establish conduction in the transistor 201 of the second or next NOR unit 20 during the time in which the input source 60 is attempting to prevent conduction in all the transistors of the ring counter.

The values of the capacitors 51, 52 and 53 are selected so that for a given set of circuit parameters (including transistor characteristics and input pulse width and repetion rate) the magnitude of the charging current is sufficient to hold the next unit of the counter ON for a time duration which is greater than the duration of an input or advance pulse.

Upon the cessation of the first input pulse, that is, upon the return of the output of the source 60 to the level *x*, the depicted ring counter is in a stable condition in which the transistor 201 of the second NOR unit 20 is conducting and in which the transistors 101 and 301 of the units 10 and 30 are positively locked in their OFF states by the output of the unit 20.

Similarly, the response of the herein-considered ring counter to a second input pulse results in a stable condition in which the transistor 301 of the third NOR unit 30 is conducting and in which the transistors 101 and 201 of the units 10 and 20 are positively locked in their OFF states by the output of the unit 30. This stable condition, which, as noted, results from the receipt by the counter of two input pulses, is sensed by the utilization circuit 70. Note that, subsequent to the first cycle of operation of the counter, the utilization circuit 70 will have a signal or voltage change applied thereto in response to every third signal output of the source 60; that is, the utilization circuit 70 will be actuated by the second, fifth, eighth, eleventh, fourteenth, etc. pulses from the source 60.

An illustrative set of parameters for a specific ring counter circuit embodying the principles of this invention and suitable for operation at an input pulse repetition rate of 500,000 pulses per second, each pulse having a width of 0.1 microsecond, is as follows—level *x*: +4.0 volts; level *y*: +0.8 volt; diodes 105, 106, 107, 205, 206, 207, 305, 306, 307: Western Electric A2101 single-junction diffused silicon diodes; diodes 112, 212, 312: Western Electric A2086 multiple-junction diffused silicon diodes; sources 111, 211, 311: +12.0 volts; sources 115, 215, 315: +4.0 volts; resistors 108, 208, 308: 3900 ohms; resistors 113, 213, 313: 5100 ohms; resistors 116, 216, 316: 560 ohms; transistors 101, 201, 301: Western Electric A2126 diffused silicon transistors; capacitors 51, 52, 53: 430 micromicrofarads.

It is to be understood that the above-described arrangements are only illustrative of the application of the principles of the present invention and that numerous other arrangements may be devised by those skilled in the art without departing from the spirit and scope of the invention. For example, although emphasis herein has been directed to a ring counter including only three NOR units, it is to be clearly understood that other such units may be connected to the depicted arrangement in accordance with the teachings herein to form a ring counter having a counting capacity which is greater than that of the herein-described counter.

What is claimed is:

A ring counter comprising a plurality of transistors each of which includes a base, a collector, and a grounded emitter electrode, each of said transistors being operable to an ON condition and an OFF condition, a multiple junction diode respectively associated with each of said transistors, each diode having a predetermined forward bias threshold value, whereby a bias voltage of a value less than said threshold value applied to one of said diodes causes only a negligible current to flow therethrough, each of said diodes having one electrode thereof connected to the base electrode of its associated transistor, each of said diodes being poled to conduct current in the same direction as the base-to-emitter junction of its associated transistor, means respectively associated with each of said multiple junction diodes and connected to the other electrode of the associated diode for biasing said diode in the forward current direction, circuit means interconnecting the collector electrode of each transistor to a point between the biasing means and multiple junction diode associated with each other transistor thereby interconnecting said transistors in a ring configuration so that when one transistor is in its ON condition the forward voltage applied to each of the multiple juction diodes respectively associated with the other transistors is below said threshold value thereof and only sufficient to cause a negligible current flow therethrough thereby maintaining the others of said transistors in their OFF conditions, input signal means coupled to the base electrode of each of said transistors and operative to switch said one of said transistors to its OFF condition, and memory means including a capacitor respectively connected between the collector electrode and the base electrode of adjacent transistors in said ring configuration.

References Cited in the file of this patent

UNITED STATES PATENTS

| | | |
|---|---|---|
| 2,503,662 | Flowers | Apr. 11, 1950 |
| 2,964,653 | Cagle | Dec. 13, 1960 |

FOREIGN PATENTS

| | | |
|---|---|---|
| 1,064,105 | Germany | Aug. 27, 1959 |

OTHER REFERENCES

Lewis: Electrical Counting, Macmillan, 1943, pages 90–92.